United States Patent [19]
Routh

[11] 3,939,462
[45] Feb. 17, 1976

[54] DOPPLERIZING A SIGNAL OF VARYING FREQUENCY

[75] Inventor: Claude C. Routh, San Diego, Calif.

[73] Assignee: The United States of America as represented by the Secretary of the Navy, Washington, D.C.

[22] Filed: Dec. 28, 1966

[21] Appl. No.: 605,498

[52] U.S. Cl. ............... 340/3 E; 35/10.4; 340/5 D
[51] Int. Cl.² ................... G01S 9/66; G09B 9/00
[58] Field of Search ... 331/135, 137, 36, 27, 135 X; 328/140, 141, 15, 16; 332/16; 340/3 E, 5 D; 35/10.4

[56] References Cited
UNITED STATES PATENTS

| | | | |
|---|---|---|---|
| 2,743,362 | 4/1956 | Leed | 331/36 X |
| 3,076,151 | 1/1963 | Swanson | 331/137 X |
| 3,164,659 | 1/1965 | Abrams | 35/10.4 |

*Primary Examiner*—Richard A. Farley
*Attorney, Agent, or Firm*—R. S. Sciascia; G. J. Rubens; T. M. Phillips

[57] ABSTRACT

The closed feedback loop of an oscillator contains a network (i.e. a resonant circuit or filter) which has a distinct phase-frequency characteristic so as to cause an overall in-phase condition. In the subject feedback loop, shifting the phase of the feedback wave in the filter, the frequency of the oscillator will shift due to its double heterodyning circuit to reestablish a net zero phase shift around the loop. This oscillator is particularly adapted to shift a sonar signal frequency to simulate true doppler shift where this shift is a fixed percentage of the frequency.

1 Claim, 3 Drawing Figures

INVENTOR
CLAUDE C. ROUTH

DOPPLERIZING A SIGNAL OF VARYING FREQUENCY

The invention described herein may be manufactured and used by or for the Government of the United States of America for governmental purposes without the payment of any royalties thereon or therefor.

BACKGROUND

This invention relates to a variable frequency oscillator of a type suitable for simulating doppler frequency changes in a repeater or transponder and is particularly directed to means for shifting a frequency even though the frequency to be repeated may vary widely within a broad range.

In prior art sonar training devices and in sonar decoys, it has been found comparatively easy to receive, amplify and retransmit sonar signals to simulate an enemy submarine. Also, it has been easy to give a constant frequency shift to the received frequency to simulate relative motion between the observer and the decoy. But, if a constant doppler shift is given a frequency modulated signal, the targets will have an apparent velocity which is different for each frequency and hence would be unrealistic since true doppler is a fixed percentage of the frequency. With the advent of frequency modulated sonar signals and other variable frequency sonars where there is a rapid change in frequency, a system was required in which doppler frequency shift was a fixed percentage, or a slowly changing percentage, of the signal frequency.

SUMMARY

The object of this invention is to provide an improved frequency changer in which a given or controllable percentage change in signal frequency is effected regardless of the instantaneous value of the signal frequency.

The object of this invention is attained in a closed regenerative loop with sufficient amplifier gain to generate self-sustained oscillations. Frequency determining means in the loop comprise a reactive filter network of a type having a known, preferably linear, functional relationship between the operating frequency and the phase shift through the filter. Means is provided for shifting the phase of the wave applied to the filter, whereupon the frequency of self-sustained oscillations in the loop automatically adjusts to bring the total shift in the loop back to zero.

Other objects and features of this invention will become apparent to those skilled in the art by referring to the preferred embodiment described in the following specification and shown in the accompanying drawings in which.

Figure 3:
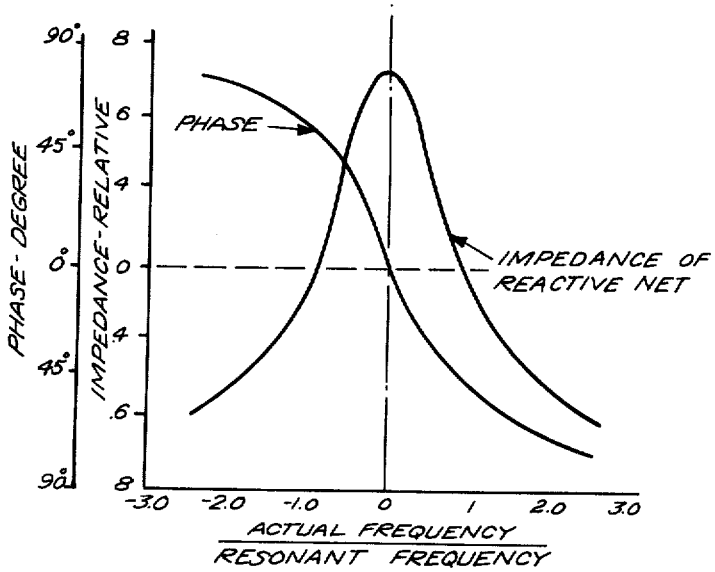
FIG. 3 shows the impedance and phase characteristics of a bandpass filter network employed in the system of FIG. 1.

The closed loop shown generally at 10 contains a feedback circuit for self-sustained oscillation and includes one or more sections or stages of amplifiers such as those shown at 12, 14 and 16. It is contemplated that the total gain of the amplifiers is sufficient to overcome the losses of the loop and to provide the necessary energy for the desired self-sustained oscillation. The frequency determining element of the loop is, according to this invention, the reactive filter network 18. This is in conjunction with phase shifter 26 in that the frequency shift is such that the phase shift in filter 18 cancels that of phase shifter 26. The network may conveniently comprise a bandpass filter with a substantially linear phase-frequency characteristic over a substantial range of frequencies. The characteristics shown in FIG. 3 of a resonant circuit, which could be used at 18, includes the usual bell-shaped impedance curve, and the S-shaped phase curve. In the conventional parallel resonant circuit, the phase varies substantially linearly with frequency changes from +0.5 to −0.5 for the valve of Q times the cycles off resonance divided by the resonant frequency of the circuit. Bandpass filters are designed where the phase varies quite linearly with frequency over the bandpass region. The novel feature of this invention is based on the principal that the oscillations of a closed loop will build up to a frequency which satisfies the in-phase condition for an oscillator. That is, there must be a net zero phase shift around the loop at the operating frequency, and a phase shift in either direction at any point in the loop will cause a corresponding frequency shift. In the embodiment shown, the operating frequency is shifted in phase at the input of filter 18 which phase shift can be made a dependent variable of any outside controllable quantity to be measured. The filter 18 may, typically, comprise a bandpass network or a parallel resonant circuit having the general characteristics illustrated in FIG. 3. As usual, the impedance across the network is maximum and the reactance is zero at resonance. Off resonance the current lags or leads the voltage depending on the sign of the predominant reactance. In network 18, it is contemplated that phase shall be the independent variable, and that frequency shall be the dependent variable.

Figure 1:
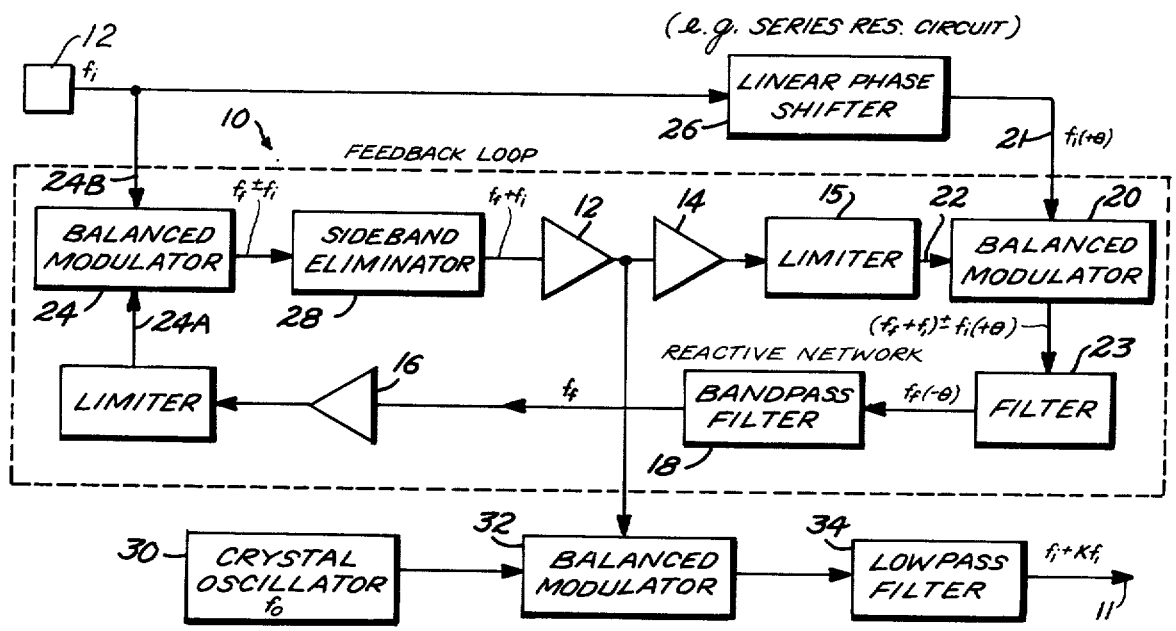
FIG. 1 is a block diagram of one phase-controlled dopplerizer utilizing the oscillator of this invention.

In FIG. 1 means is shown for causing the frequency of oscillation in the loop 10 to follow instantaneous changes in frequency of the input signal, $f_i$, at the input source or terminal 12. It is convenient then to provide at output terminal 11 the frequency $f_i$ plus a fixed percentage change, $k$, of the input frequency. That is, the signal at output terminal 11 is $f_i \pm kf_i$. If the input frequency $f_i$ is a sonar frequency the output frequency at 11 could, for example, be 1.02 of the input frequency to represent a 0.2 of one percent range rate change of three knots per hour, based on two way doppler for an echo and a sound velocity of 5000 ft./sec.

In the loop are connected the balanced modulators 20 and 24. Modulator 20 has inputs 21 and 22, and modulator 24 has inputs 24A and 24B. It has been established that the output signal of a balanced modulator has a phase which follows any phase change in either of the input signals. It will facilitate this disclosure to assume that no phase shift occurs except in filters provided for that purpose. The input frequency $f_i$ in FIG. 1 is fed to both balanced modulators, the connection to modulator 20 being made through the reactance network 26. Network 26 passes the input band $f_i$ but shifts the phase of $f_i$ an amount proportional to the frequency of the $f_i$. Preferably, the phase shift is a linear function of frequency which characteristic can be obtained in such filters as the lowpass filter. The input frequency $f_i$ to the phase shifter 26 is thus shifted and may be designated $f_i(\theta)$, at terminal 21 of modulator 20.

If now, the self-sustained frequency of the loop is $f_f$, then the output of modulator 20 contains $f_f$ as well as $f_i(\theta)$. As will appear below, this $f_i(\theta)$ factor will effectively control the frequency of the loop.

One input 24A to the balanced modulator 24 contains the $f_f$ frequency of the loop, and the other input 24B contains the $f_i$ frequency of the input signal. The bandpass filter 28 is provided in the output of the modulator selecting one of the two sidebands of the modulation. It is assumed that modulation is effected with complete suppression of both of the two input signals and that only the sidebands $f_f \pm f_i$ appear at the output. It is found expedient to select the upper sideband, $f_f + f_i$. After amplification of at least 40 or 50 db in amplifier 12 and 14 the signal is limited in limiter 15 and applied to the modulator 20, in the output of which will be found $(f_f + f_i) \pm f_i(\theta)$. If filter 23 selects the lower sideband product, the output of filter 23 will be $f_f$ alone but at the new phase angle $\theta$ established by the phase shifter 26. If in practice filter 18 has a bandwidth which selects the lower sideband, filter 23 is not required.

The reactive network 18 may be conveniently a conventional bandpass filter or a parallel resonant circuit so designed that the center of the passband is at or near $f_f$ of the loop. The bandpass network phase shift varies from $-\pi$ radians to $+\pi$ radians over the band passed. The response of the filter is made linear in order to follow the response of the phase shifter 26. As the phase of the input of modulator 20 shifts in response to shifting frequency $f_i$ then the frequency of the feedback loop builds up to a frequency dependent upon the phase characteristics of the bandpass filter 18 in the loop. It is necessary, of course, to correlate the phase shifts in 26 and 18 with the desired phase shift which equals the doppler shift over the input bandwidth. If the doppler shift is to be linear with frequency the two filters 26 and 18 must "track" over the band. To facilitate this they can both be linear. Other responses can be obtained by modifying the response of either or both.

Where it is desired to eliminate the local frequency $f_f$ from the output at terminal 11 it is convenient to cancel that frequency by the local oscillator 30 which can be made to beat with the loop frequency in the balanced modulator 32. If the frequency $f_o$ of oscillator 30 is the same as the resonant frequency of the filter 18, which is the loop operating frequency when there is no phase shift, then the output at terminal 11 will be precisely the input frequency $f_i$. If the loop frequency is shifted from this then the shift appears at terminal 11 as the same frequency shift in $f_i$.

Figure 2:
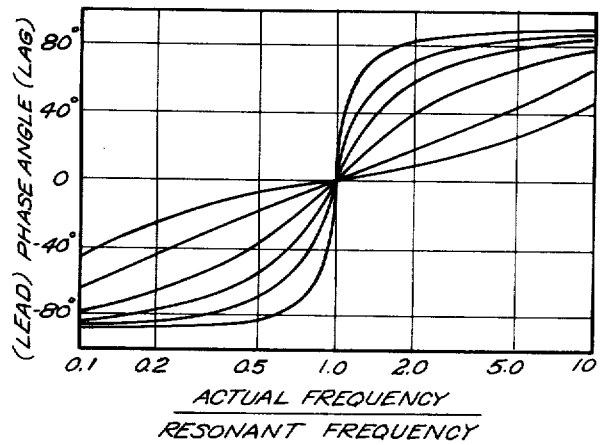
FIG. 2 shows a phase-frequency characteristic of a linear phase shifter employed in FIG. 1.

The phase-frequency characteristic desired for the phase shifter 26 is the type shown in FIG. 2, where the family of curves represent the characteristics of a series resonant circuit is for various values of Q. It will be noted that the straight section thus constructed will linearly shift phase over a frequency range from 0.1 to 10 times resonant frequency. Several filter sections may be cascaded to obtain the amount of phase shift required.

As a typical example, if the phase shift is 30° at 1 kc/s and 150° at 5 kc/s in filter 26, then for a 2 cps doppler at 1 kc/s (which is 0.2 of one percent) the bandpass filter 18 in the feedback must have a 30° shift for a frequency of 2 cps. from the center of the band or frequency corresponding to zero phase shift in the bandpass filter. The relation must extend rather linearly to the point where for a 10 cps. doppler at 5 kc/s, the bandpass filter must have a 150° shift for a frequency of 10 cps. from the center of the band. These figures would indicate a bandpass requirement in the filter 18 of about 24 cps. corresponding to 360° phase shift. As the doppler shift increases the stringency of the filter requirements eases since a greater number of cycles per second correspond to the same 360°. Further, it is desirable to have a relatively wide passband for filter 18 to pass short sonar "pings". The widest bandwidth obtainable using crystals in filter 18 was 600 cps. at an $f_o$ or 100 kc/s frequency. This passes pulses as short as the reciprocal of this frequency or 1.6 milliseconds, $f_o$ is high in frequency compared to $f_i$.

The device, in summary, converts phase change that is a function of the received signal into a frequency shift. If the factor $k$ is a constant, the device is a frequency multiplier by a factor of $1 + k$. This factor $k$ is a function of the frequency and can be varied greatly because it is determined by the frequency as phase response of two filters, 26 and 18 and there is a wide choice for both in modern network designs.

Obviously many modifications and variations of the present invention are possible in the light of the above teachings. It is therefore to be understood that within the scope of the appended claims the invention may be practiced otherwise than as specifically described.

I claim:

1. A transponder for shifting all frequancy components of signal frequency, $f_i$, by a factor $K$, to simulate a true doppler frequency shift in a complex signal, said transponder comprising;

means for receiving said signal, $f_i$, a closed loop comprising an amplifier with a feedback circuit, the gain of said amplifier being sufficient to generate self-sustained oscillations in the loop, said loop including a first balanced modulator, a second balanced modulator, a band pass filter, and two side band selector means connected, respectively, in the outputs of said modulators for selecting one side band at the output of each of said modulators, said band pass filter having a center resonant frequency, $f_f$, and having an extended substantially linear phase-frequency characteristic extending above and below the zero phase at said resonant frequency, a linear phase shifter, means for applying said signal, respectively, to said first balanced modulator, and to said second balanced modulator, the signal circuit to said second modulator including said linear phase shifter so that the phase of the selected side band at the output of said second modulator shifts as the frequency $f_i$ shifts, so that the reactive network of said band pass filter will shift the frequency of oscillation, $f_f$, of said loop as the frequency of said input signal $f_i$ is shifted to $kf_i$, and means for extracting the frequency $f_i + kf_i$ in said loop comprising a fixed frequency oscillator of frequency $f_o$ equal to said center frequency, $f_f$, of the band pass filter and means for adding said $f_o$ to $f_f + f_i$ in said loop to yield true doppler frequency shift, $f_i + kf_i$.

* * * * *